US012678965B2

(12) United States Patent
McAllister et al.

(10) Patent No.: US 12,678,965 B2
(45) Date of Patent: Jul. 14, 2026

(54) ROBOTIC WIRE INSERTION USING CONNECTOR SEGMENTATION

(71) Applicant: The Boeing Company, Arlington, VA (US)

(72) Inventors: Wyatt Spalding McAllister, Santa Monica, CA (US); Joshua Daniel Lampkins, Los Angeles, CA (US); Darren Michael Chan, Thousand Oaks, CA (US)

(73) Assignee: The Boeing Company, Arlington, VA (US)

( * ) Notice: Subject to any disclaimer, the term of this patent is extended or adjusted under 35 U.S.C. 154(b) by 289 days.

(21) Appl. No.: 18/325,741

(22) Filed: May 30, 2023

(65) Prior Publication Data

US 2024/0399586 A1     Dec. 5, 2024

(51) Int. Cl.
| | |
|---|---|
| *B25J 9/16* | (2006.01) |
| *G06T 7/11* | (2017.01) |
| *G06T 7/136* | (2017.01) |

(52) U.S. Cl.
CPC .............. *B25J 9/1697* (2013.01); *G06T 7/11* (2017.01); *G06T 7/136* (2017.01); *G06T 2207/30164* (2013.01)

(58) Field of Classification Search
CPC ........ B25J 9/1697; B25J 9/1687; B25J 18/00; G06T 7/11; G06T 7/136; G06T 2207/30164; G06T 2207/20104; G06T 2207/30108; G06T 7/0004; G06T 7/194; G05B 2219/40028; G05B 2219/40032; G05B 2219/40584; H01R 43/26; H04N 13/106; H04N 13/204; H04N 2013/0074; H04N 2013/0092

USPC ....... 700/259, 95, 117; 900/47, 41; 382/141, 382/153, 156
See application file for complete search history.

(56) References Cited

U.S. PATENT DOCUMENTS

| | | | |
|---|---|---|---|
| 11,151,405 B1 | 10/2021 | Hoffmann | |
| 11,307,361 B2 | 4/2022 | Ruggles | |
| 11,374,374 B2 | 6/2022 | Graber-Tilton et al. | |
| 2021/0044069 A1 | 2/2021 | Hoffmann | |

(Continued)

OTHER PUBLICATIONS

Ikonen, L., H., and O. Oinonen. "A computer vision approach for robotized handling of sheets in a manufacturing cell." Proceedings of the Scandinavian Conference on Image Analysis. vol. 1. Proceedings Published by Various Publishers, 1997. (Year: 1997).*

(Continued)

*Primary Examiner* — Ellis B. Ramirez
(74) *Attorney, Agent, or Firm* — Yee & Associates, P.C.

(57) ABSTRACT

A method for inserting a wire. An image of a connector is generated using a camera system connected to an end effector. The end effector is at a connector pose facing the connector. A region in the image encompassing the connector is selected. An initial mask is created using the image and the region. The initial mask comprises a background region and a connector region. A segmentation mask is created using the initial mask and the image, wherein the segmentation mask includes edges for the connector. Thresholding is applied to the segmentation mask to recover pixels for the connector and generate a final mask. The final mask is used to insert the wire into the connector.

20 Claims, 11 Drawing Sheets

(56) References Cited

U.S. PATENT DOCUMENTS

| | | |
|---|---|---|
| 2021/0399470 A1 | 12/2021 | Hoffmann |
| 2022/0234208 A1 * | 7/2022 | Hoffman et al. |
| 2022/0254055 A1 * | 8/2022 | Sohmshetty .............. G06T 7/13 |
| 2023/0344185 A1 * | 10/2023 | Blacken ................. B25J 9/1687 |

OTHER PUBLICATIONS

Hefner, Florian, Simon Schmidbauer, and Jã¶rg Franke. "Vision-based adjusting of a digital model to real-world conditions for wire insertion tasks." Procedia CIRP 97 (2021): 342-347. (Year: 2021).*
"Universal Robots e-Series User Manual," UR5e, Original instructions (en), Aug. 2018, copyright Universal Robots 2023, 302 pages.
Illingworth et al., "A Survey of the Hough Transform," Computer Vision, Graphics, and Image Processing vol. 44, Issue 1, Oct. 1988, 30 pages.
Mukhopadhyay et al., "A survey of Hough Transform," Pattern Recognition, vol. 48, Issue 3, Mar. 2015, 18 pages.
Powell, "A Fast Algorithm for Nonlinearly Constrained Optimization Calculations," Numerical Analysis, Lecture Notes in Mathematics book series (LNM), vol. 630, Dundee, Scotland, 1977, pp. 144-157.
Rother et al., ""GrabCut"—Interactive Foreground Extraction using Iterated Graph Cuts," ACM Transactions on Graphics, vol. 23, Issue 3, Aug. 1, 2004, 6 pages.
European Patent Office Extended Search Report, dated Aug. 23, 2024, regarding Application No. EP24166263.4, 8 pages.
Zhang Xiaolin et al: "Automatic Detection of Avionics Electrical Connector Pins", Journal of Physics: Conference Series, Institute of Physics Publishing, GB, vol. 2218, No. 1, Mar. 1, 2022 (Mar. 1, 2022), XP020419377, ISSN: 1742-6588, DOI: 10.1088/1742-6596/2218/1/012048, [retrieved on Mar. 1, 2022].

* cited by examiner

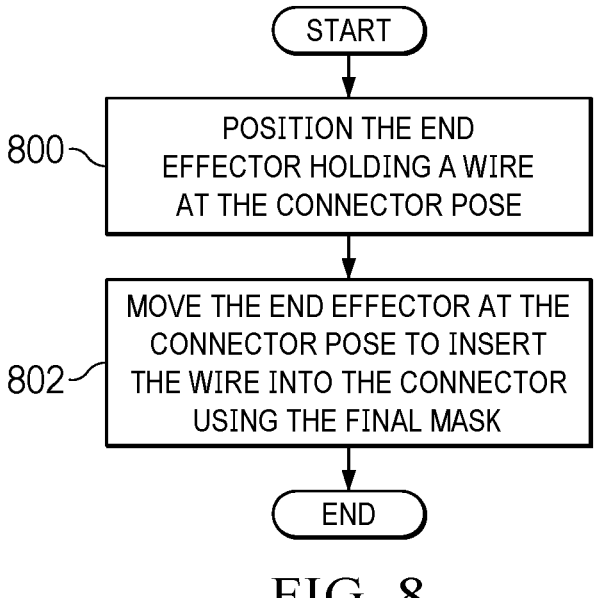

800 — POSITION THE END EFFECTOR HOLDING A WIRE AT THE CONNECTOR POSE

802 — MOVE THE END EFFECTOR AT THE CONNECTOR POSE TO INSERT THE WIRE INTO THE CONNECTOR USING THE FINAL MASK

FIG. 8

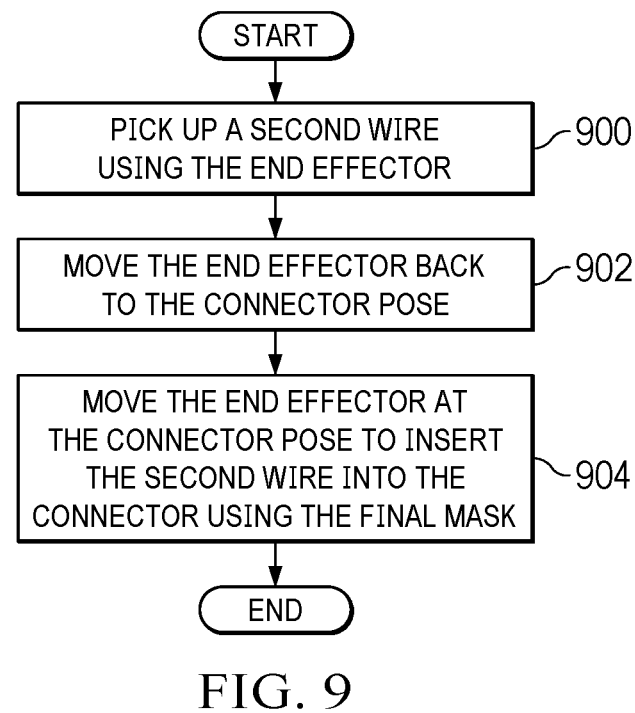

900 — PICK UP A SECOND WIRE USING THE END EFFECTOR

902 — MOVE THE END EFFECTOR BACK TO THE CONNECTOR POSE

904 — MOVE THE END EFFECTOR AT THE CONNECTOR POSE TO INSERT THE SECOND WIRE INTO THE CONNECTOR USING THE FINAL MASK

1402 — SPECIFICATION AND DESIGN

1404 — MATERIAL PROCUREMENT

1406 — COMPONENT AND SUBASSEMBLY MANUFACTURING

1408 — SYSTEM INTEGRATION

1410 — CERTIFICATION AND DELIVERY

1412 — IN SERVICE

1414 — MAINTENANCE AND SERVICE

1500

AIRCRAFT

1502 — AIRFRAME     INTERIOR — 1506

SYSTEMS

PROPULSION SYSTEM     ELECTRICAL SYSTEM 1508   1512

HYDRAULIC SYSTEM     1510   1514

ENVIRONMENTAL SYSTEM

1504

ROBOTIC WIRE INSERTION USING CONNECTOR SEGMENTATION

BACKGROUND INFORMATION

1. Field

The present disclosure relates generally to manufacturing assemblies and, in particular, to inserting wires into connectors using connector segmentation to create masks of the connectors.

2. Background

In manufacturing commercial aircraft, wires are often installed in bundles to form wire harnesses. This process involves wires being fed and cut by the machine into desired lengths. Wire contacts are attached to the wires. These wires are placed into a location for assembly using robots. These wires can then be manipulated by a robot with an end effector to form a wire bundle. This robotic end effector can be or can have a wire contact insertion tool.

The end effector picks up wires, moves the wires, and inserts the wire contacts for the wires into electrical connectors. In automating the assembly of wire bundles, accuracy in inserting ends of wires into connectors with high levels of precision is needed. One manner of automation for assembling wire bundles involves using machine learning models such as neural networks that are trained to move the wires and insert the contacts into connectors. The use of machine learning models can be specific to various types of connectors and settings for wire insulation.

Therefore, it would be desirable to have a method and apparatus that takes into account at least some of the issues discussed above, as well as other possible issues. For example, it would be desirable to have a method and apparatus that overcomes the problem of obtaining a desired level of accuracy in inserting wire contacts into connectors.

SUMMARY

An embodiment of the present disclosure provides a robotic system. The robotic system comprises an end effector; a camera system connected to the end effector; and a controller. The controller is configured to generate an image of a connector using the camera system with the end effector at a connector pose facing the connector. The controller is configured to select a region in the image encompassing the connector. The controller is configured to create an initial mask using the image and the region. The initial mask comprises a background region and a connector region. The controller is configured to create a segmentation mask using the initial mask and the image. The segmentation mask includes edges for the connector. The controller is configured to apply thresholding to the segmentation mask to recover pixels for the connector and generate a final mask.

Another embodiment of the present disclosure provides a method for inserting a wire. An image of a connector is generated using a camera system connected to an end effector. The end effector is at a connector pose facing the connector. A region in the image encompassing the connector is selected. An initial mask is created using the image and the region. The initial mask comprises a background region and a connector region. A segmentation mask is created using the initial mask and the image, wherein the segmentation mask includes edges for the connector. Thresholding is applied to the segmentation mask to recover pixels for the connector and generate a final mask. The final mask is used to insert the wire into the connector.

Another embodiment of the present disclosure provides a wire assembly system comprising a computer system and a controller in the computer system. The controller is configured to generate an image of a connector using a camera system with the end effector at a connector pose facing the connector. The controller is configured to select a region in the image encompassing the connector. The controller is configured to create an initial mask using the image and the region. The initial mask image comprises a background region and a connector region. The controller is configured to create a segmentation mask using the initial mask and the image. The segmentation mask includes edges for the connector. The controller is configured to apply thresholding to the segmentation mask to recover pixels for the connector and generate a final mask. The controller is configured to insert a wire into the connector using the end effector and the final mask.

Yet another embodiment of the present disclosure provides a computer program product for wire assembly. The computer program product comprises a computer-readable storage medium having program instructions embodied therewith. The program instructions are executable by a computer system to cause the computer system to generate an image of a connector using a camera system connected to an end effector at a connector pose facing the connector. The program instructions are executable by the computer system to cause the computer system to select a region in the image encompassing the connector. The program instructions are executable by the computer system to cause the computer system to create an initial mask using the image and the region. The initial mask image comprises a background region and a connector region. The program instructions are executable by the computer system to cause the computer system to create a segmentation mask using the initial mask and the image. The segmentation mask includes edges for the connector. The program instructions are executable by the computer system to cause the computer system to apply thresholding to the segmentation mask to recover pixels for the connector and generate a final mask. The program instructions are executable by the computer system to cause the computer system to insert a wire into the connector using the end effector and the final mask.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a flowchart of a process for inserting a set of wires in accordance with an illustrative embodiment;

FIG. 9 is an illustration of a flowchart of a process for inserting a second wire in accordance with an illustrative embodiment;

DETAILED DESCRIPTION

The illustrative embodiments recognize and take into account one or more different considerations. Increasing the accuracy and speed in inserting wires into connectors can involve a number of different factors. Determining the pose and location of a wire contact is one factor in automating the process for robotic wire insertion. Another consideration involves estimating the location of connectors in an image as part of process for automated robotic wire insertion.

One manner in which connectors can be located involves using a vision system to detect the color of the connector prior to wire insertion. The tuning parameters for this type of connector detection are sensitive to ambient lighting conditions. Thus, it would be desirable to detect the location of connectors in a manner that is invariant to color and ambient lighting conditions.

Thus, the illustrative examples provide a method, apparatus, system, and computer program product for detecting connectors and, in particular, for segmenting images of connectors for use in a robotic wire insertion process. In the illustrative examples, the connector detection system generates images from a first-person view. In other words, the images are generated from the perspective of the robotic end effector. In one illustrative example, a fixed stereo camera system can be positioned near an end of the end effector on a robotic arm for enabling egocentric vision. Additionally, a lighting system is used to illuminate the end effector. The lighting system can be selected to reduce or eliminate ambient light detected by the fixed stereo camera system.

As result, the images are generated in the perspective of the end effector and the illumination reduces issues with ambient lighting conditions. These types of images can be processed to automatically segment the connector. Further, removing redundant computations can reduce this process to increase the speed in which wires are inserted into connectors.

In the illustrative examples, the robotic system enables the segmentation of images of a connector and generates a final connector mask that can be used to insert wires into the connector. In the illustrative examples, the camera system is connected to the end effector and can generate the image used for segmentation to generate a mask to insert wires.

Figure 1:
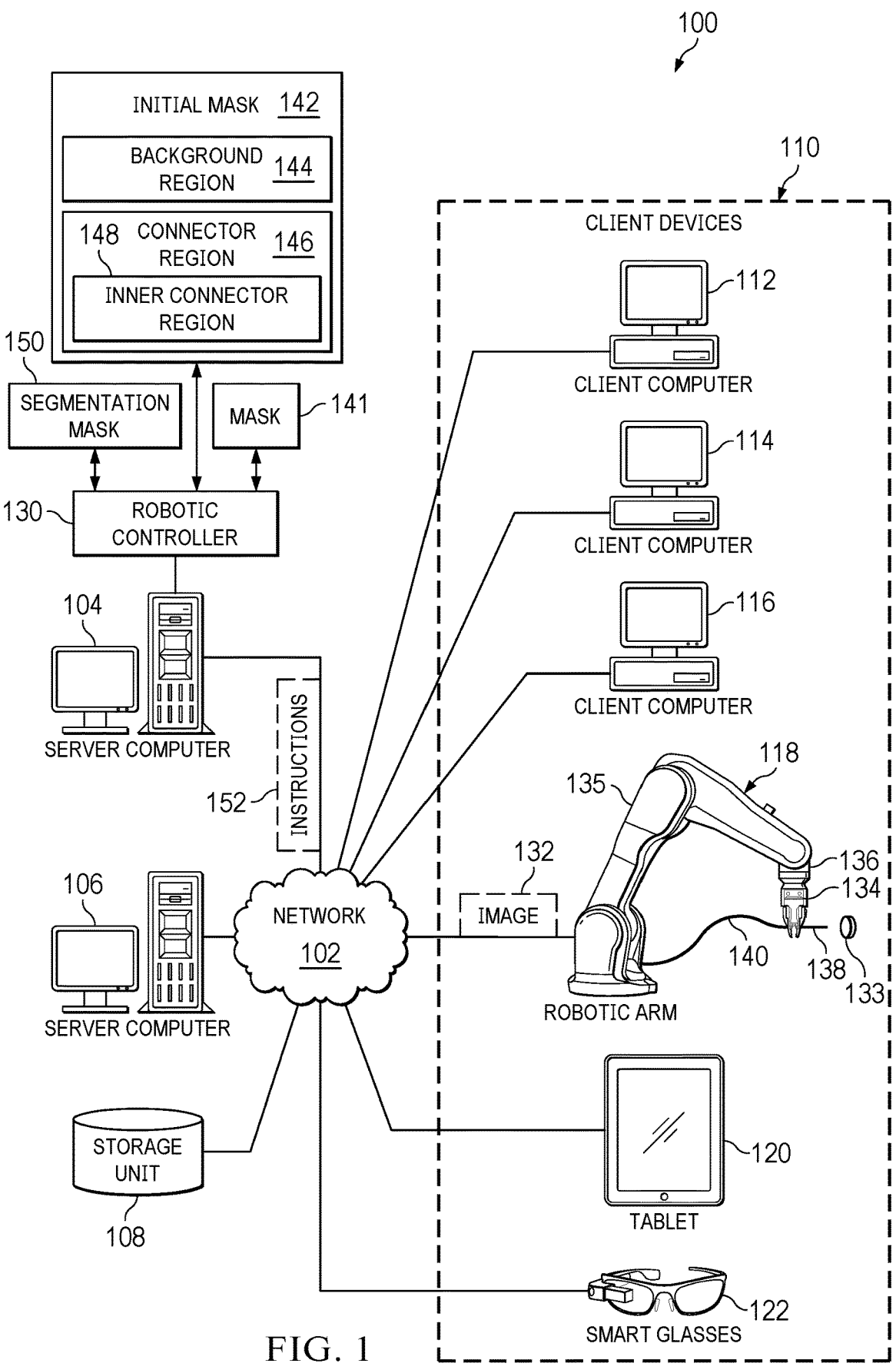
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as robotic arm 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of Things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage medium and downloaded to a data processing system or other device for use. For example, program instructions can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

In this illustrative example, robotic controller 130 is located in server computer 104. Robotic controller 130 can control the operation of robotic arm 118. In this example, robotic controller 130 controls the operation of robotic arm 118 to perform manufacturing operations. For example, robotic arm 118 can be used to assemble wire bundles. As depicted, robotic arm 118 can insert wire contacts for wires into connectors as part of the process for assembling wire bundles.

As depicted, robotic controller 130 can control robotic arm 118 to send image 132 to robotic controller 130 over network 102. Robotic arm 118 has arm 135 connected to end effector 136. In this example, robotic arm 118 has 6 degrees of freedom.

In this example, stereoscopic camera 134 is connected to end effector 136 of robotic arm 118. As depicted, end effector 136 holds wire 140 having wire contact 138. As depicted, end effector 136 has a pose facing the connector 133. As a result, stereoscopic camera 134 also has the pose facing connector 133 to generate image 132 of connector 133. This configuration of stereoscopic camera 134 results in this camera being a first-person perspective camera system.

Robotic controller 130 controls a stereoscopic camera 134 with end effector 136 at the pose facing connector 133 to generate and send image 132 of connector 133. In this illustrative example, robotic controller 130 can analyze image 132 to generate mask 141 for connector 133. In this example, this analysis by robotic controller 130 includes receiving a selection of the region within image 132 which is used to generate initial mask 142. Initial mask 142 has background region 144 and connector region 146. Connector region 146 in initial mask 142 is defined by the selection of the region within image 132. In one illustrative example, robotic controller 130 can also determine or calculate inner connector region 148 within connector region 146.

Robotic controller 130 creates segmentation mask 150 using initial mask 142 and image 132. Robotic controller 130 uses a segmentation process that analyzes initial mask 142 in image 132 to identify pixels in image 132 that are considered part of connector 133. The result is mask 141.

Robotic controller 130 can control the movement of arm 135 to move end effector 136 with wire contact 138 to insert wire contact 138 into a hole in connector 133.

In this example, this movement can be controlled by robotic controller 130 sending instructions 152 from server computer 104 to robotic arm 118 over network 102. These instructions can include commands and data used to operate robotic arm 118. Robotic arm 118 can have a processor or controller that receives instructions 152 and processes instructions 152.

In this example, robotic controller 130 also identifies or saves the pose of end effector 136. Stereoscopic camera 134 was used to generate image 132. As result, end effector 136 can be controlled to pick up a second wire and return to the pose to insert the second wire into another hole in connector 133. By saving the pose of end effector 136, mask 141 can be reused.

The illustrative example in FIG. 1 is an example of one implementation and not meant to limit the manner in which other illustrative examples can be implemented. For example, stereoscopic camera 134 can be replaced with a different type of camera such as a color camera.

Figure 2:
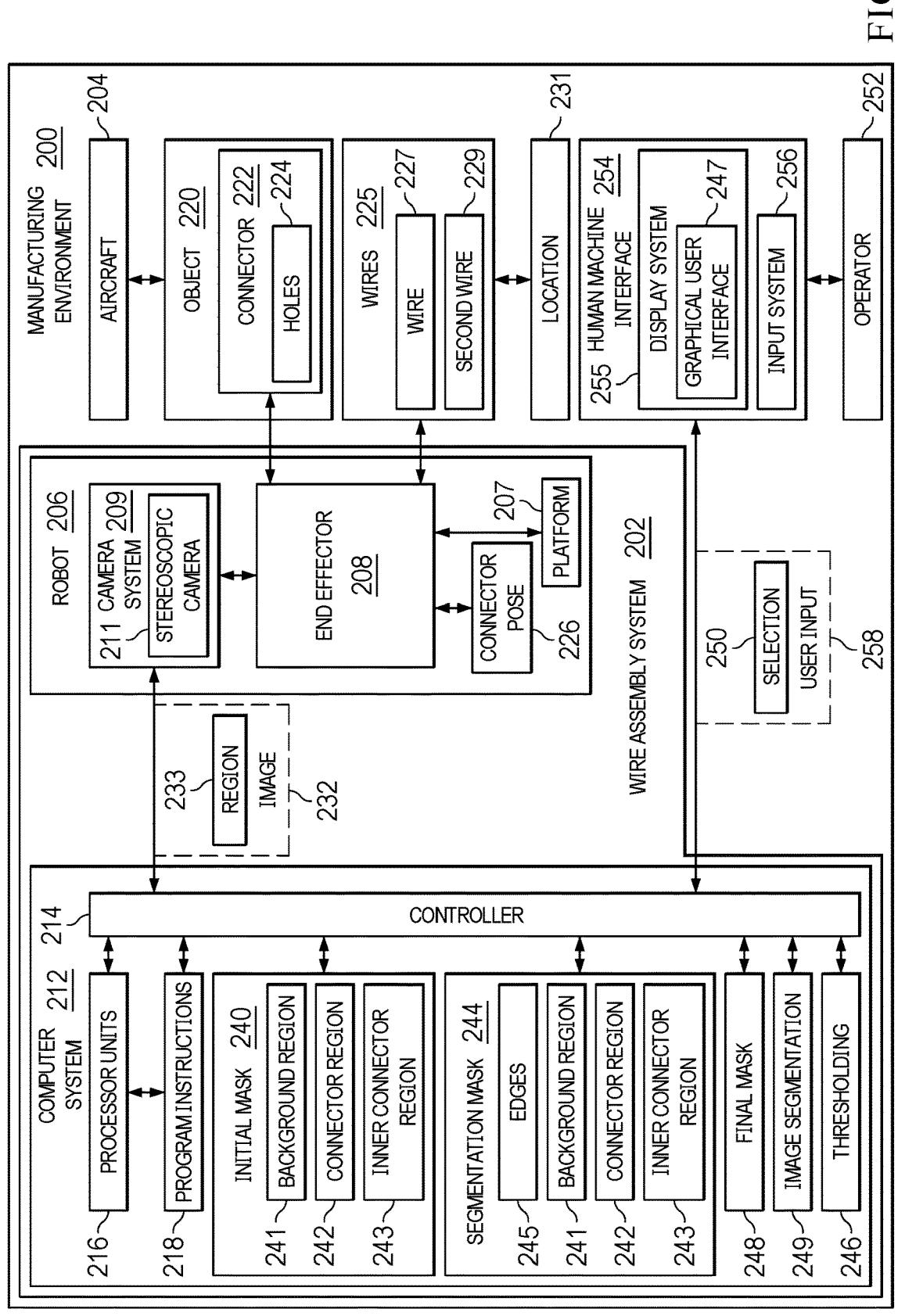
FIG. 2 is an illustration of a block diagram of a manufacturing environment in accordance with an illustrative embodiment.

With reference now to FIG. 2, an illustration of a block diagram of a manufacturing environment is depicted in accordance with an illustrative embodiment. In this illustrative example, manufacturing environment 200 includes components that can be implemented in hardware such as the hardware shown in network data processing system 100 in FIG. 1.

As depicted, wire assembly system 202 in manufacturing environment 200 can perform operations to manufacture aircraft 204. In this example, aircraft 204 can take a number of different forms. For example, aircraft 204 can be a commercial aircraft, an airplane, a rotorcraft, a tilt-rotor aircraft, a tilt wing aircraft, a vertical takeoff and landing aircraft, an electrical vertical takeoff and landing vehicle, a personal air vehicle, and other suitable types of aircraft.

Operations can be performed to manufacture other platforms and objects other than aircraft 204. For example, these operations can be used to manufacture, for example, a mobile platform, a stationary platform, a land-based structure, an aquatic-based structure, and a space-based structure. More specifically, the platform can be a surface ship, a tank, a personnel carrier, a train, a spacecraft, a space station, a satellite, a submarine, an automobile, a power plant, a bridge, a dam, a house, a manufacturing facility, a building, an engine, a piece of equipment, and other suitable platforms.

In this illustrative example, wire assembly system 202 comprises a number of different components. As depicted, wire assembly system 202 comprises computer system 212, controller 214, and robot 206. As depicted, controller 214 is located in computer system 212.

Controller 214 can be implemented in software, hardware, firmware or a combination thereof. When software is used, the operations performed by controller 214 can be implemented in program instructions configured to run on hardware, such as a processor unit. When firmware is used, the operations performed by controller 214 can be implemented in program instructions and data and stored in persistent memory to run on a processor unit. When hardware is employed, the hardware may include circuits that operate to perform the operations in controller 214.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium may be a network. The data processing systems may be selected from at least one of a computer, a server computer, a tablet, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer. When the number of processor units 216 executes program instructions 218 for a process, the number of processor units 216 can be one or more processor units that are in the same computer or in different computers. In other words, the process can be distributed between processor units 216 on the same or different computers in a computer system 212.

Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

Thus, the connector segmentation system and process implemented reduces the need for manually tuning the vision parameters. As a result, the robotic system can be more easily set up and be more adaptable to new connector types. In other words, different shapes and sizes of connectors can be handled by the robotic system. Further, this robotic system is configured to operate even with variations in ambient lighting conditions through the lighting system. As a result, wire insertion reliability is improved.

Further, the robotic system and process reduces computational redundancy. In the illustrative examples, computed connector segmentation and hole locations do not need to be recomputed prior to each wire insertion in the illustrative examples. The state of each connector is saved and can be used at a later time. This optimization reduces computational redundancy, improving assembly time in large-scale manufacturing processes. Thus, illustrative examples reduce manufacturing costs, improve wire bundle assembly speed and quality, and increase automation for inserting wires into connectors.

In this illustrative example, robot 206 comprises platform 207, end effector 208, and camera system 209. In this depicted example, end effector 208 is connected to platform 207 and camera system 209 is connected to an end effector 208. Camera system 209 can include one or more cameras.

When one component is "connected" to another component, the connection is a physical connection. For example, a first component, camera system 209, can be considered to be physically connected to a second component, end effector 208, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both. For example, camera system 209 can be connected to end effector 208 through a robotic arm. The robotic arm is a part of platform 207. Camera system 209 can be connected to the robotic arm, which is in turn connected to end effector 208.

Platform 207 can take a number of different forms. For example, platform 207 can be selected from a group comprising a robotic arm, a crawler, an unmanned aerial vehicle, and other suitable types of platforms that can be connected to an end effector 208. In yet other illustrative examples, platform 207 can be connected to another component or platform. For example, end effector 208 can be connected to a robotic arm that is connected to a crawler or mobile base.

In this illustrative example, robot 206 can perform operations on object 220 as part of a process to manufacture aircraft 204. In this illustrative example, object 220 is connector 222 having holes 224. For example, end effector 208 can insert a set of wires 225.

Controller 214 can determine or calculate connector pose 226 for end effector 208 with connector pose 226 relative to connector 222. In the illustrative example, connector pose 226 is the position and orientation of end effector 208. The position is described using three-dimensional coordinates in this example. The orientation can be with respect to a particular feature or features of end effector 208.

In this illustrative example, controller 214 is configured to perform a number of different operations in inserting a set of wires 225 into connector 222. Prior to manipulating the set of wires 225 for insertion, controller 214 is configured to perform operations to make identifying and inserting the set of wires 225 more accurate, more efficient, or some combination thereof, as compared to current techniques.

In the illustrative example, controller 214 moves end effector 208 to connector pose 226 facing connector 222. In this example, connector pose 226 can be such that holes 224 are seen in image 232. In one example, the surface of connector 222 with holes 224 is planar or substantially perpendicular to an axis from end effector 208 and camera system 209 to the surface of connector 222.

In this illustrative example, controller 214 controls camera system 209 to generate image 232 of connector 222 with end effector 208 at connector pose 226 facing connector 222. In this illustrative example, camera system 209 is stereoscopic camera 211.

As depicted, camera system 209 sends image 232 to controller 214 for processing. Further, controller 214 stores connector pose 226 from which image 232 is generated for later use.

In this illustrative example, controller 214 selects region 233 in image 232 encompassing connector 222. In other words, connector 222 is located within region 233 in image 232.

In this illustrative example, region 233 can be selected by controller 214 using selection 250 in user input 258. In this example, operator 252 can operate human machine interface 254 to generate user input 258 including selection 250.

As depicted, human machine interface (HMI) 254 comprises display system 255 and input system 256. Display system 255 is a physical hardware system and includes one or more display devices on which graphical user interface 247 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, or some other suitable device that can output information for the visual presentation of information.

Operator 252 is a person that can interact with graphical user interface 247 through user input 258 generated by input system 256. Input system 256 is a physical hardware system and can be selected from at least one of a mouse, a keyboard, a touch pad, a trackball, a touchscreen, a stylus, a motion sensing input device, a gesture detection device, a data glove, a cyber glove a haptic feedback device, neural interface, biometric interface, or some other suitable type of input device.

With human machine interface 254, controller 214 can display image 232 received from camera system 209 on display system 255 in human machine interface 254. Controller 214 can receive user input 258 from input system 256. In this example, user input 258 comprises selection 250 of region 233.

Controller 214 creates initial mask 240 using image 232 and region 233 in image 232. In this example, initial mask 240 is an image and comprises background region 241 and connector region 242.

In creating an initial mask 240, controller 214 creates background region 241 as a first portion of the image 232 outside of region 233. Controller 214 creates connector region 242 as a second portion of image 232 defined by region 233.

In one illustrative example, controller 214 can also create inner connector region 243. For example, controller 214 can create inner connector region 243 that is inside of connector region 242. In this example, inner connector region 243 is selected as having a higher probability of encompassing the connector than the connector region.

In this example, initial mask 240 can have background region 241, connector region 242 defined by region 233 in image 232, and inner connector region 243 that is an inner portion of connector region 242. In other examples, inner connector region 243 may be omitted and segmentation mask 244 can be created using initial mask 240 with background region 241 and connector region 242.

Controller 214 creates segmentation mask 244 which is also an image. Segmentation mask 244 is created by controller 214 using initial mask 240 and image 232. In this example, segmentation mask 244 includes background region 241, connector region 242, and inner connector region 243. Further, segmentation mask 244 also includes edges 245 for connector 222. In this illustrative example, segmentation mask 244 can be generated using image segmentation 249 to determine edges 245 for connector 222.

Image segmentation 249 can be implemented using various segmentation techniques. For example, image segmentation 249 can be performed using the GrabCut algorithm. The GrabCut algorithm is an image segmentation based on graph cuts. This algorithm can use iterative graph cuts to identify connector 222 using image 232 and initial mask 240. With image segmentation 249, pixels in image 232 can be reclassified using initial mask 240 into two distinct regions based on pixel similarity such as likely to be the background or likely to be the connector.

In the depicted example, controller 214 applies thresholding 246 to segmentation mask 244 to recover pixels for connector 222 to generate final mask 248. For example, segmentation mask 244 can be multiplied with image 232. Thresholding 246 can be used to separate connector 222 in image 232 from background region 241 in segmentation mask 244.

In this example, each pixel in image 232 within edges 245 defining connector 222 is preserved. The rest of the image is removed or otherwise modified to form final mask 248, which depicts the connector region as delineated from the background. This final mask may be composed of white pixels corresponding to the connector region and black pixels corresponding to the background.

In this example, final mask 248 is an image that can be used by controller 214 to insert the set of wires 225 into connector 222. In particular, final mask 248 can be used to insert a set of wires 225 into holes 224 in connector 222.

For example, in inserting the set of wires 225, controller 214 positions end effector 208 holding wire 227 in the set of wires 225 at connector pose 226. As used herein, a "set of" items is one or more items. For example, a set of wires 225 is one or more of wires 225.

From connector pose 226, controller 214 moves end effector 208 at connector pose 226 to insert the wire 227 into connector 222 using final mask 248.

In this example, controller 214 picks up second wire 229 in the set of wires 225 using end effector 208. In this example, second wire 229 is picked up from a location 231 where wires 225 are placed or stored for insertion into connector 222. Controller 214 moves end effector 208 back to connector pose 226 from location 231. Controller 214 moves end effector 208 at connector pose 226 to insert second wire 229 into connector 222 using final mask 248. In this example, the same mask can be used without generating a new mask by moving end effector 208 back to connector pose 226 where image 232 was taken to generate final mask 248. In this manner, increased speed in robot 206 automatically inserting wires 225 into connector 222 can be performed as compared to generating a new mask each time a wire is inserted into connector 222.

In one illustrative example, one or more technical solutions are present that overcome a technical problem with automating insertion of wires into connectors. As a result, one or more technical solutions can provide an inability to increase at least one of the accuracy or speed at which wires can be inserted into connectors.

Computer system 212 can be configured to perform at least one of the steps, operations, or actions described in the different illustrative examples using software, hardware, firmware or a combination thereof. As a result, computer system 212 operates as a special purpose computer system in which controller 214 in computer system 212 enables generating masks for use in inserting wires that increases the speed and accuracy at which wires can be inserted into connectors. In particular, controller 214 transforms computer system 212 into a special purpose computer system as compared to currently available general computer systems that do not have controller 214.

In the illustrative example, the use of controller 214 in computer system 212 integrates processes into a practical application for inserting wires into a connector that increases the performance of computer system 212. In other words, controller 214 in computer system 212 is directed to a practical application of processes integrated into controller 214 in computer system 212 that generates an image of the connector, selects the region in the image encompassing the connector, and creates an initial mask using the image and the region. Further, this practical application includes reading a segmentation mask using an initial mask image and applying thresholding to generate a final mask. This final mask is then used in a practical application to insert wires into the connector using the final mask. In these examples, the end effector is moved to the pose at which the image used to generate the mask was taken by the camera system on the end effector.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, selection 250 of region 233 can be performed using other techniques other than user input 258. For example, object recognition processes can be used to identify connector 222 in image 232 and create region 233 based on this recognition. As a result, automation of wire insertion can be further automated using robot 206. In another example, object 220 can be any object in addition to or in place of connector 222 in which a set of wires or other objects can be inserted into holes in object 220 or otherwise interface with object 220.

Figure 3:
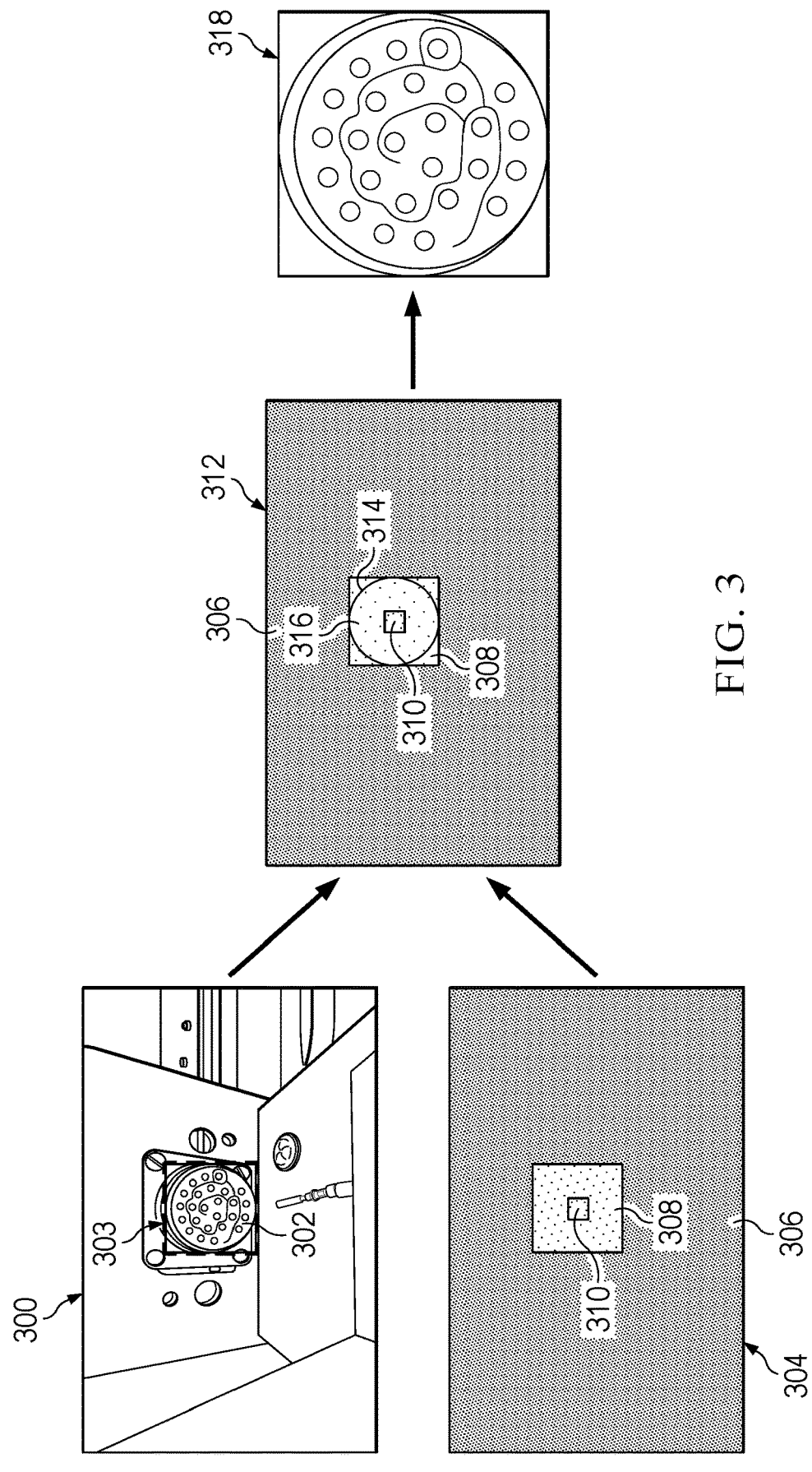
FIG. 3 is an illustration of dataflow for generating a final mask for use in inserting wires in accordance with an illustrative embodiment.

Turning next to FIG. 3, an illustration of dataflow for generating a final mask for use in inserting wires is depicted in accordance with an illustrative embodiment. This dataflow can be performed using wire assembly system 202 in FIG. 2.

Image 300 is generated by a camera system on an end effector of the robot. In this example, image 300 is an image of connector 302. Image 300 is an example of an implementation of image 232 in FIG. 2. As depicted, region 303 has been selected to encompass connector 302.

Also depicted is initial mask 304. Initial mask 304 is an image generated from the selection of region 303 in image 300. Initial mask 304 is an example of an initial mask 240 in FIG. 2. As depicted, initial mask 304 includes background region 306 and connector region 308. Also depicted in this example is inner connector region 310.

In this illustrative example, the regions in initial mask 304 have different levels of confidence as to what is located in a particular region. For example, background region 306 has a 100% confidence that the pixels in image 300 are part of the background and do not include connector 302. Connector region 308 has a 50% confidence that pixels from image 300 are for connector 302. Inner connector region 310 has a 100% confidence that pixels within image 300 corresponding to this region are for connector 302.

In this illustrative example, segmentation mask 312 is generated using image 300 and initial mask 304. In this example, a segmentation process uses image 300 and initial mask 304 as an input to generate segmentation mask 312.

As depicted, segmentation mask 312 includes background region 306, connector region 308, and segmentation is performed on segmentation mask 312. Additionally, segmentation mask 312 includes edges 314 for connector 302 in image 300. As seen, edges 314 define region 316 that encompasses connector 302.

Segmentation mask 312 is processed to obtain final mask 318. Final mask 318 is an example of final mask 248 in FIG. 2. In this example, segmentation mask 312 is processed using image 300 to obtain final mask 318. Thresholding is performed to identify pixels from image 300 that are within edges 314 defining region 316 encompassing connector 302. In this manner, final mask 318 can be generated for use in inserting wires into connector 302.

Figure 4:
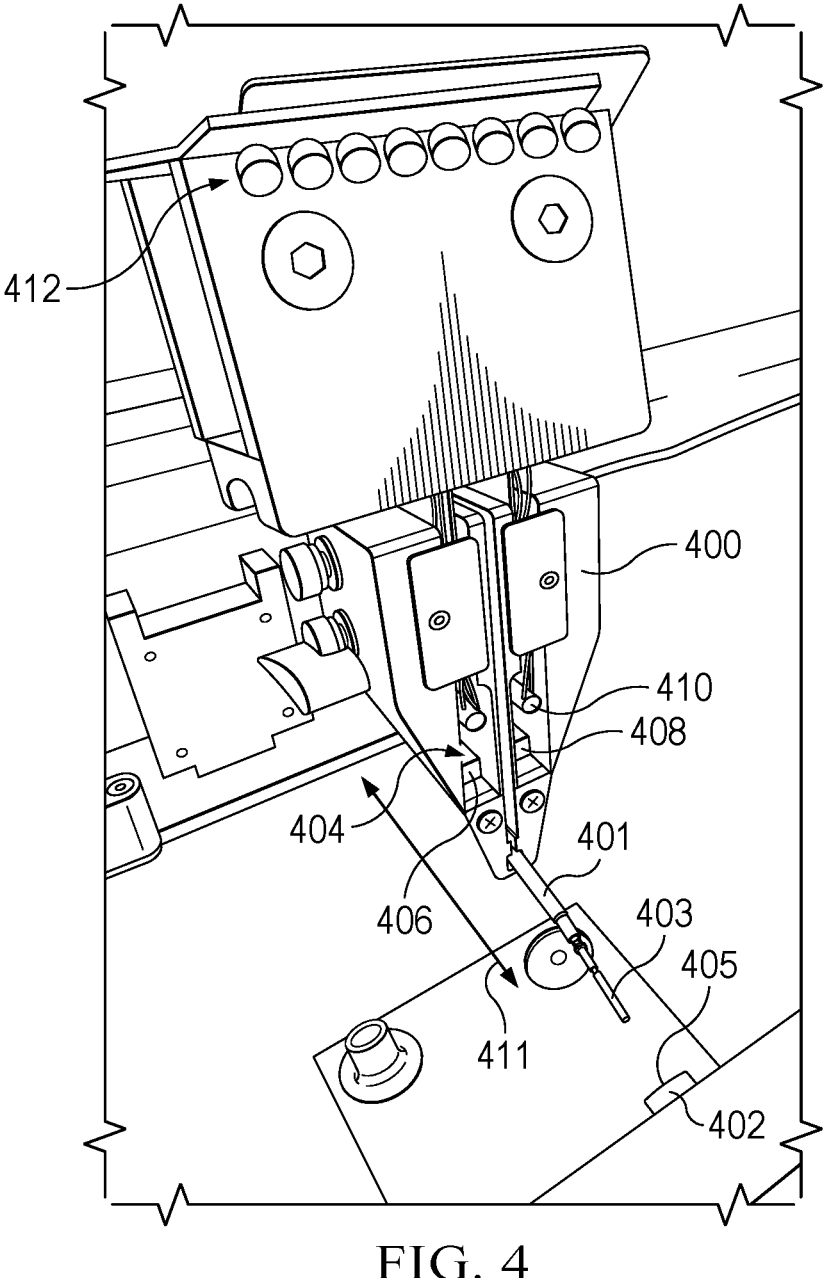
FIG. 4 is an illustration of an end effector for a robotic arm in accordance with an illustrative embodiment.

Turning now to FIG. 4, an illustration of an end effector for a robotic arm is depicted in accordance with an illustrative embodiment. In this illustrative example, end effector 400 is an example of one implementation for end effector 208 in FIG. 2. In this illustrative example, end effector 400 is configured for wire insertion. As depicted, end effector 400 holds wire 401. As depicted, stereoscopic camera 404 is connected to end effector 400. Stereoscopic camera 404 comprises first camera 406 and second camera 408. In this illustrative example, stereoscopic camera 404 also includes lighting in the form of light emitting diode (LED) system 410. Stereoscopic camera 404 is an example of stereoscopic camera 211 in FIG. 2. Additional lighting is provided by overhead light emitting diode (LED) array 412. The use of this lighting system can reduce or eliminate ambient light in the image generated by stereoscopic camera 404. As result, more consistency in images can be generated for identifying connector 402.

As depicted in this example, placement of stereoscopic camera 404, light emitting diode system 410, and overhead light emitting diode array 412 can direct light at connector 402 and reduce the effects of environmental light when generating images of connector 402. As a result, stereoscopic camera 404 can generate images that generate a mask of connector 402 more accurately.

In this illustrative example, end effector 400 has a connector pose facing connector 402. In other words, end effector 400 faces surface 405. More specifically, end effector 400 has a connector pose facing surface 405 of connector 402. In this example, surface 405 is the surface in which holes (not shown) are present in connector 402 for wire insertion of wires, such as wire 401 with wire contact 403.

With this configuration, first camera 406, second camera 408, light emitting diode (LED) system 410, overhead light emitting diode (LED) array 412, and end effector 400 at a connector pose can generate an image of connector 402 with a desired quality that increases the ability generate a final mask for performing wire insertion. In this example, the connector pose of end effector 400 includes the position of the tip or other part of end effector 400 as well as orientation in the form of a direction for end effector 400 such as axis 411. Although this example illustrates the use of stereoscopic camera 404, other types of cameras can be used for segmenting connectors. For example, a single color camera can be used in place of stereoscopic camera 404.

Figure 5:
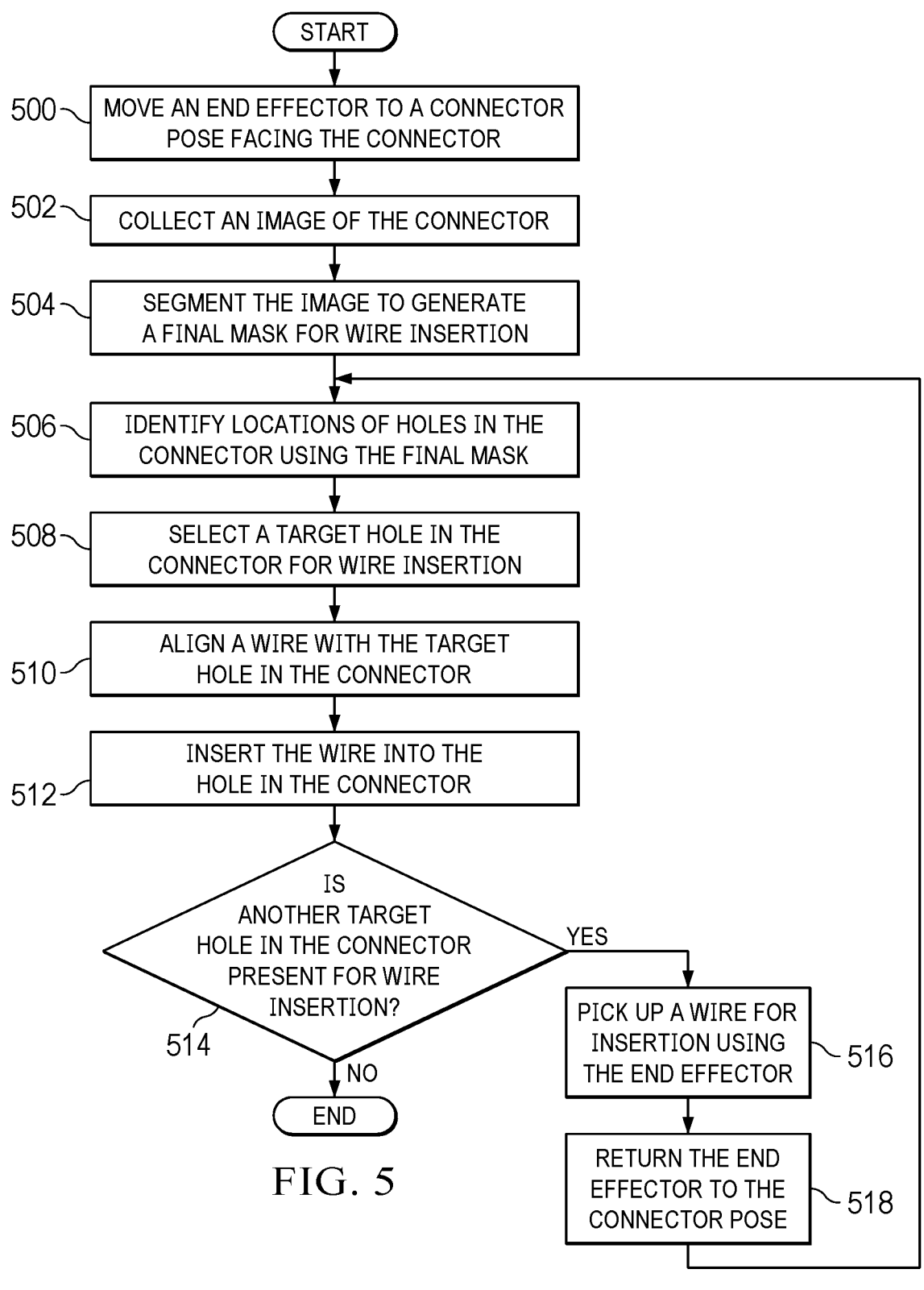
FIG. 5 is an illustration of a flowchart of a process for inserting a set of wires into holes in a connector in accordance with an illustrative embodiment.

Turning next to FIG. 5, an illustration of a flowchart of a process for inserting a set of wires into holes in a connector is depicted in accordance with an illustrative embodiment. The process in FIG. 5 can be implemented in hardware, software, or both. When implemented in software, the process can take the form of program instructions that are run by one of more processor units located in one or more hardware devices in one or more computer systems. For example, the process can be implemented in controller 214 in computer system 212 in FIG. 2.

The process begins by moving an end effector to a connector pose facing the connector (operation 500). The process collects an image of the connector (operation 502). The process segments the image to generate a final mask for wire insertion (operation 504).

The process identifies locations of holes in the connector using the final mask (operation 506). In operation 506, the holes can be identified using a circle Hough transform (CHT). This transform is used to detect circles in a digital image and can be used to identify holes within the final mask, which is an image of the connector.

The process selects a target hole in the connector for wire insertion (operation 508). The process aligns a wire with the target hole in the connector (operation 510). The process inserts the wire into the hole in the connector (operation 512).

The process determines whether another target hole in the connector is present for wire insertion (operation 514). The number of target holes in the connector may depend on the number connections that are needed. In other words, wires may not be inserted into all of the holes in a connector. If another target hole is present, the process picks up a wire for insertion using the end effector (operation 516). The process then returns the end effector to the connector pose (operation 518). The process returns to operation 506. The same final mask is used because the new wire is inserted by the same end effector at the connector pose. As a result, insertion of wires can be performed more quickly because generating a new mask is not needed.

With reference again to operation 514, if another target hole is not present, the process terminates thereafter.

Figure 6:
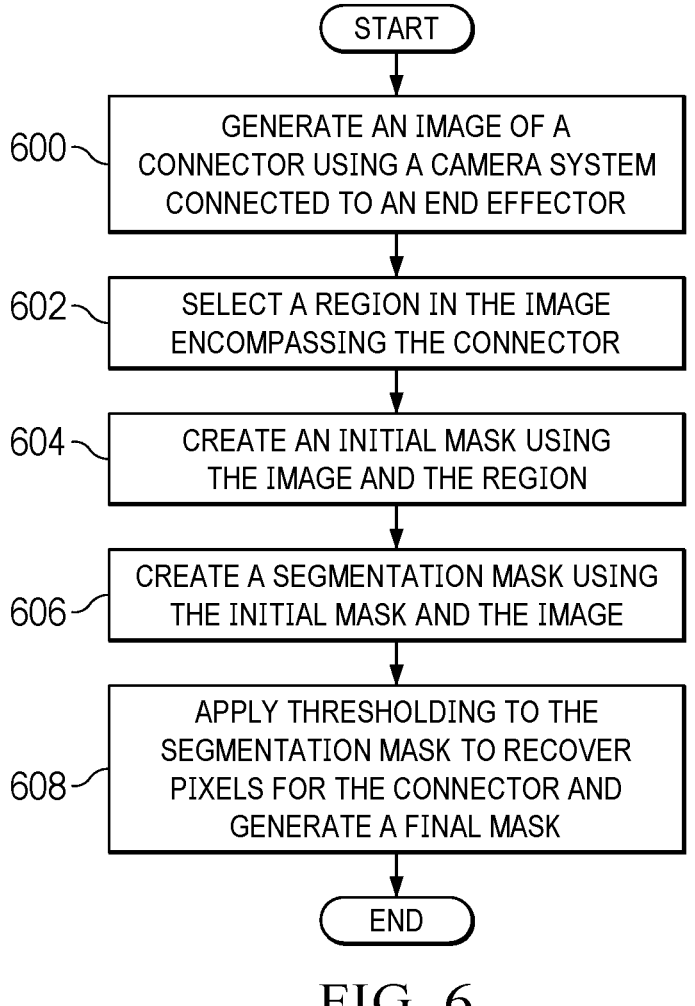
FIG. 6 is an illustration of a flowchart of a process for inserting a wire in accordance with an illustrative embodiment.

Turning next to FIG. 6, an illustration of a flowchart of a process for inserting a wire is depicted in accordance with an illustrative embodiment. The process in FIG. 6 can be implemented in hardware, software, or both. When implemented in software, the process can take the form of program instructions that are run by one of more processor units located in one or more hardware devices in one or more computer systems. For example, the process can be implemented in controller 214 in computer system 212 in FIG. 2.

The process begins by generating an image of a connector using a camera system connected to an end effector (operation 600). In operation 600, the end effector is at a connector pose facing the connector. The process selects a region in the image encompassing the connector (operation 602).

The process creates an initial mask using the image and the region (operation 604). In operation 604, the initial mask comprises a background region and a connector region.

The process creates a segmentation mask using the initial mask and the image (operation 606). In operation 606, the segmentation mask includes edges for the connector.

The process applies thresholding to the segmentation mask to recover pixels for the connector and generate a final mask (operation 608). The process terminates thereafter. In operation 608, the final mask is used to insert the wire into the connector.

Figure 7:
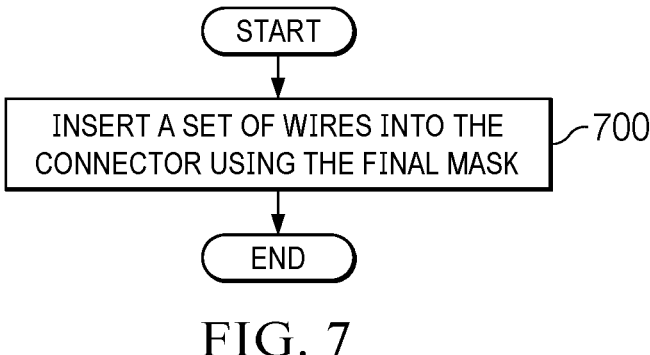
FIG. 7 is an illustration of a flowchart of a process for inserting a wire in accordance with an illustrative embodiment.

With reference next to FIG. 7, an illustration of a flowchart of a process for inserting a wire is depicted in accordance with an illustrative embodiment. The process illustrated in FIG. 7 is an example of an additional operation that can be performed with the operations in FIG. 6.

The process inserts a set of wires into the connector using the final mask (operation 700). The process terminates thereafter.

In FIG. 8, an illustration of a flowchart of a process for inserting a set of wires is depicted in accordance with an illustrative embodiment. The process illustrated in FIG. 8 is an example of an implementation of operation 700 in FIG. 7 and the operations in FIG. 6.

The process positions the end effector holding a wire at the connector pose (operation 800). The process moves the end effector at the connector pose to insert the wire into the connector using the final mask (operation 802). The process terminates thereafter.

Turning to FIG. 9, an illustration of a flowchart of a process for inserting a second wire is depicted in accordance with an illustrative embodiment. The process illustrated in FIG. 9 is an example of an additional step that can be used to implement operation 700 in FIG. 7.

The process picks up a second wire using the end effector (operation 900). The process moves the end effector back to the connector pose (operation 902).

The process moves the end effector at the connector pose to insert the second wire into the connector using the final mask (operation 904). The process terminates thereafter.

Figure 10:
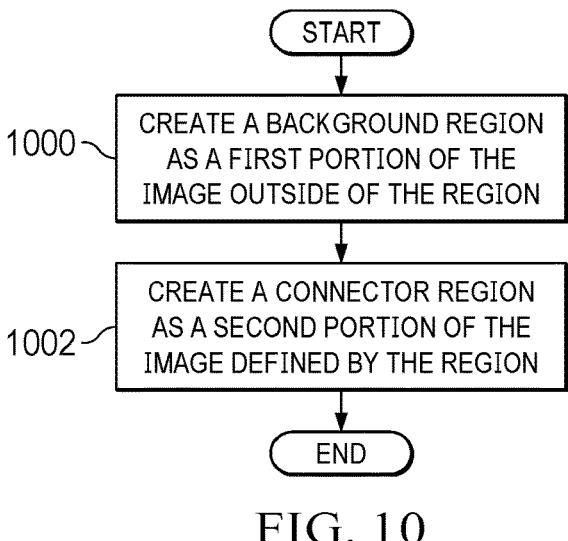
FIG. 10 is an illustration of a flowchart of process for creating an initial mask in accordance with an illustrative embodiment.

Next in FIG. 10, an illustration of a flowchart of process for creating an initial mask is depicted in accordance with an illustrative embodiment. The process in this figure is an example of an implementation for operation 604 in FIG. 6.

The process creates a background region as a first portion of the image outside of the region (operation 1000). The process creates a connector region as a second portion of the image defined by the region (operation 1002). The process terminates thereafter.

Figure 11:
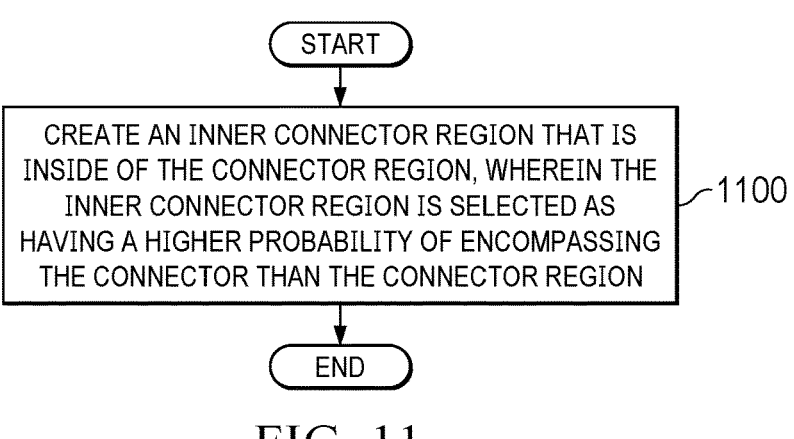
FIG. 11 is an illustration of a flowchart of a process for creating an initial mask in accordance with an illustrative embodiment.

Turning now to FIG. 11, an illustration of a flowchart of a process for creating an initial mask is depicted in accordance with an illustrative embodiment. The process in this figure is an example of additional steps that can be used with the operations in FIG. 10 to create an initial mask.

The process creates an inner connector region that is inside of the connector region, wherein the inner connector region is selected as having a higher probability of encompassing the connector than the connector region (operation 1100). The process terminates thereafter.

Figure 12:
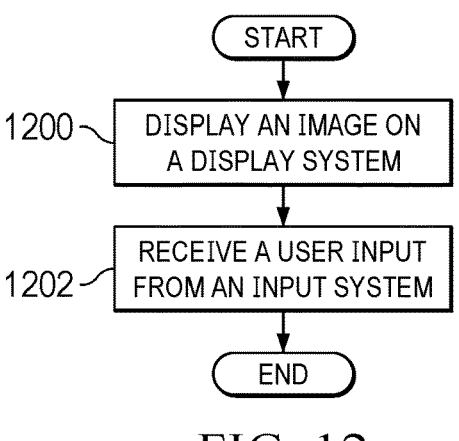
FIG. 12 is an illustration of a flowchart of a process for selecting a region in accordance with an illustrative embodiment.

With reference next to FIG. 12, an illustration of a flowchart of a process for selecting a region is depicted in accordance with an illustrative embodiment. The process in this figure is an example of an implementation for operation 602 in FIG. 6.

The process displays an image on a display system (operation 1200). The process receives a user input from an input system (operation 1202). The process terminates thereafter. In operation 1202, the user input comprises a selection of the region.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 13:
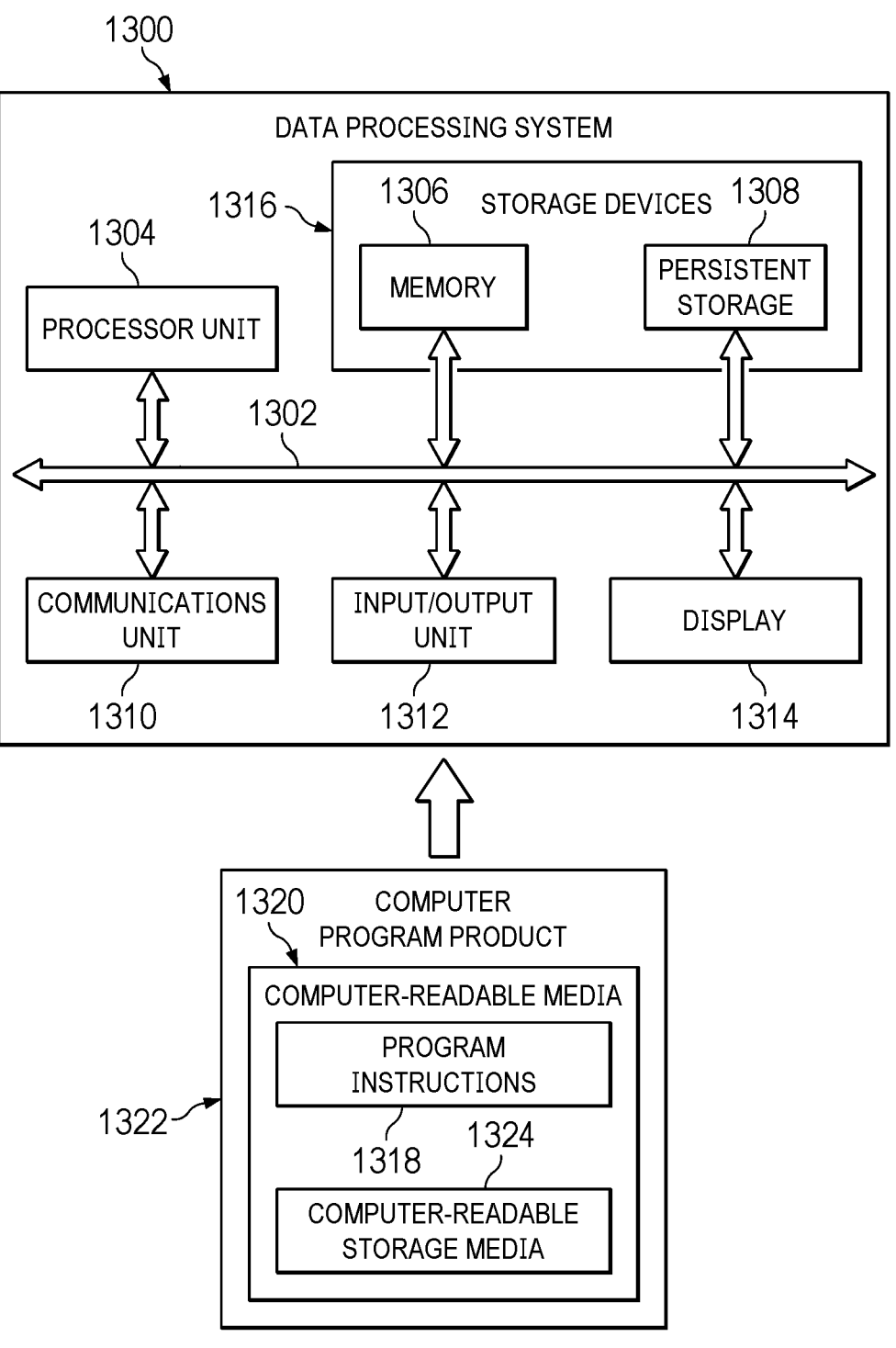
FIG. 13 is an illustration of a block diagram of a data processing system in accordance with an illustrative embodiment.

Turning now to FIG. 13, a block diagram of a data processing system is depicted in accordance with an illustrative embodiment. Data processing system 1300 can be used to implement server computer 104, server computer 106, client devices 110, in FIG. 1. Data processing system 1300 can also be used to implement FIG. 2. In this illustrative example, data processing system 1300 includes communications framework 1302, which provides communications between processor unit 1304, memory 1306, persistent storage 1308, communications unit 1310, input/output (I/O) unit 1312, and display 1314. In this example, communications framework 1302 takes the form of a bus system.

Processor unit 1304 serves to execute instructions for software that can be loaded into memory 1306. Processor unit 1304 includes one or more processors. For example, processor unit 1304 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1304 can be implemented using one or more heterogeneous processor systems in which a main processor is present with secondary processors on a single chip. As another illustrative example, processor unit 1304 can be a symmetric multi-processor system containing multiple processors of the same type on a single chip.

Memory 1306 and persistent storage 1308 are examples of storage devices 1316. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1316 may also be referred to as computer-readable storage devices in these illustrative examples. Memory 1306, in these examples, can be, for example, a random-access memory or any other suitable volatile or non-volatile storage device. Persistent storage 1308 may take various forms, depending on the particular implementation.

For example, persistent storage 1308 may contain one or more components or devices. For example, persistent storage 1308 can be a hard drive, a solid-state drive (SSD), a flash memory, a rewritable optical disk, a rewritable magnetic tape, or some combination of the above. The media used by persistent storage 1308 also can be removable. For example, a removable hard drive can be used for persistent storage 1308.

Communications unit 1310, in these illustrative examples, provides for communications with other data processing systems or devices. In these illustrative examples, communications unit 1310 is a network interface card.

Input/output unit 1312 allows for input and output of data with other devices that can be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs can be located in storage devices 1316, which are in communication with processor unit 1304 through communications framework 1302. The processes of the different embodiments can be performed by processor unit 1304 using computer-implemented instructions, which may be located in a memory, such as memory 1306.

These instructions are referred to as program instructions, computer usable program instructions, or computer-readable program instructions that can be read and executed by a processor in processor unit 1304. The program instructions in the different embodiments can be embodied on different physical or computer-readable storage media, such as memory 1306 or persistent storage 1308.

Program instructions 1318 are located in a functional form on computer-readable media 1320 that is selectively removable and can be loaded onto or transferred to data processing system 1300 for execution by processor unit 1304. Program instructions 1318 and computer-readable media 1320 form computer program product 1322 in these illustrative examples. In the illustrative example, computer-readable media 1320 is computer-readable storage media 1324.

Computer-readable storage media 1324 is a physical or tangible storage device used to store program instructions 1318 rather than a medium that propagates or transmits program instructions 1318. Computer-readable storage media 1320 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include: a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 1324, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1318 can be transferred to data processing system 1300 using a computer-readable signal media. The computer-readable signal media are signals and can be, for example, a propagated data signal containing program instructions 1318. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1320" can be singular or plural. For example, program instructions 1318 can be located in computer-readable media 1320 in the form of a single storage device or system. In another example, program instructions 1318 can be located in computer-readable media 1320 that is distributed in multiple data processing systems. In other words, some instructions in program instructions 1318 can be located in one data processing system while other instructions in program instructions 1318 can be located in another data processing system. For example, a portion of program instructions 1318 can be located in computer-readable media 1320 in a server computer while another portion of program instructions 1318 can be located in computer-readable media 1320 located in a set of client computers.

The different components illustrated for data processing system 1300 are not meant to provide architectural limitations to the manner in which different embodiments can be implemented. In some illustrative examples, one or more of the components may be incorporated in or otherwise form a portion of, another component. For example, memory 1306, or portions thereof, may be incorporated in processor unit 1304 in some illustrative examples. The different illustrative embodiments can be implemented in a data processing system including components in addition to or in place of those illustrated for data processing system 1300. Other components shown in FIG. 13 can be varied from the illustrative examples shown. The different embodiments can be implemented using any hardware device or system capable of running program instructions 1318.

Figures 14, 15:
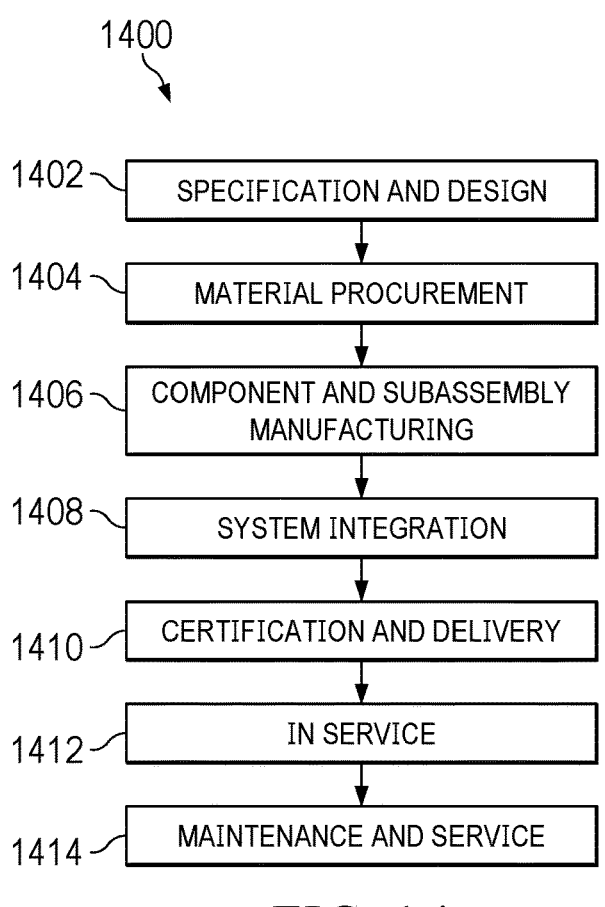
FIG. 14 is an illustration of an aircraft manufacturing and service method in accordance with an illustrative embodiment.
FIG. 15 is an illustration of a block diagram of an aircraft in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During preproduction, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 can go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14.

In one illustrative example, components or subassemblies produced in component and subassembly manufacturing 1406 in FIG. 14 can be fabricated or manufactured in a manner similar to components or subassemblies produced while aircraft 1500 is in service 1412 in FIG. 14. As yet another example, one or more apparatus embodiments, method embodiments, or a combination thereof can be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or both. The use of a number of the different illustrative embodiments may substantially expedite the assembly of aircraft 1500, reduce the cost of aircraft 1500, or both expedite the assembly of aircraft 1500 and reduce the cost of aircraft 1500.

For example, wire assembly system 202 can be used during component and subassembly manufacturing 1406 to assemble wire bundles for wiring harnesses used in aircraft 1500. As another example, wire assembly system 202 can also be used to assemble wire bundles for components used in maintenance and service 1414. Also, wire assembly system 202 can be used to manipulate other objects in addition to or in place of inserting wire contacts for wires into connectors.

Figure 16:
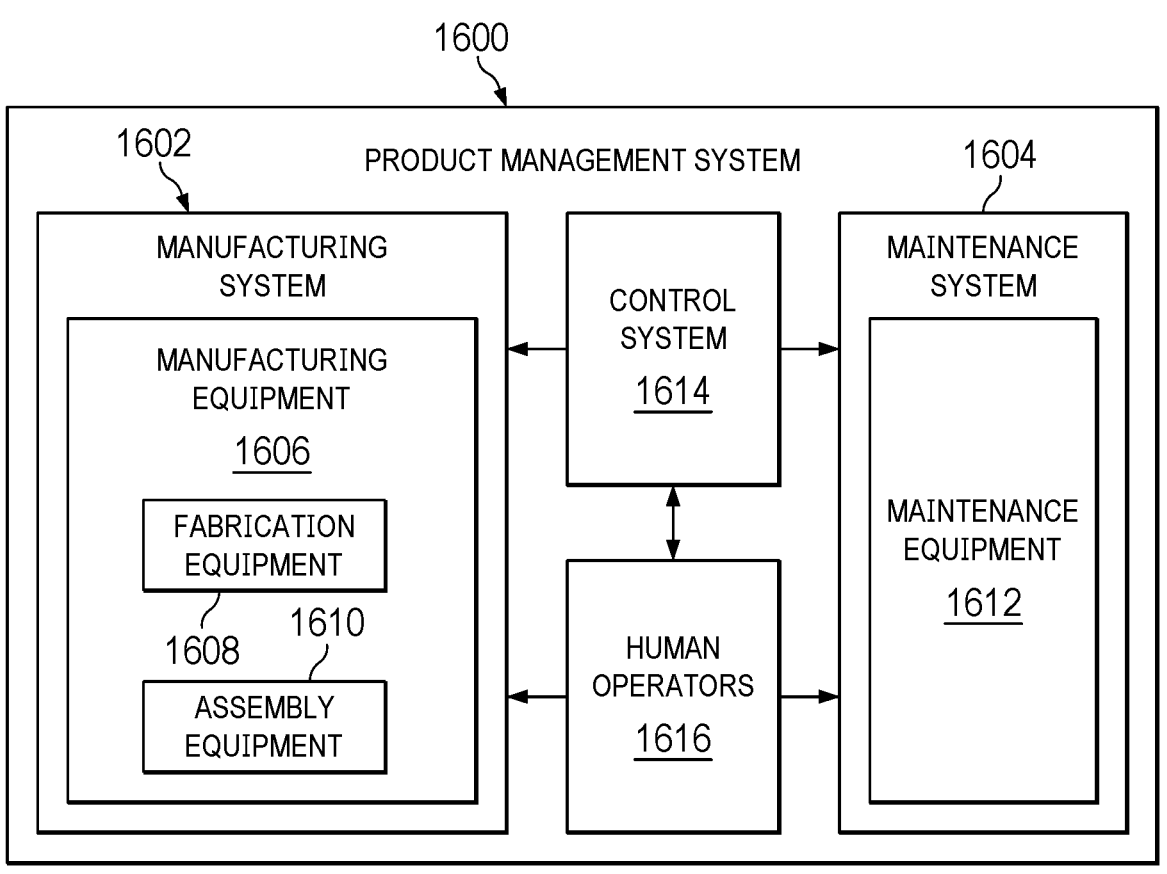
FIG. 16 is an illustration of a block diagram of a product management system in accordance with an illustrative embodiment.

Turning now to FIG. 16, an illustration of a block diagram of a product management system is depicted in accordance with an illustrative embodiment. Product management system 1600 is a physical hardware system. In this illustrative example, product management system 1600 includes at least one of manufacturing system 1602 or maintenance system 1604.

Manufacturing system 1602 is configured to manufacture products, such as aircraft 1500 in FIG. 15. As depicted, manufacturing system 1602 includes manufacturing equipment 1606. Manufacturing equipment 1606 includes at least one of fabrication equipment 1608 or assembly equipment 1610.

Fabrication equipment 1608 is equipment that is used to fabricate components or parts used to form aircraft 1500 in FIG. 15. For example, fabrication equipment 1608 can include machines and tools. These machines and tools can be at least one of a drill, a hydraulic press, a furnace, an autoclave, a mold, a composite tape laying machine, an automated fiber placement (AFP) machine, a vacuum system, a robotic pick and place system, a flatbed cutting machine, a laser cutter, a computer numerical control (CNC) cutting machine, a lathe, or other suitable types of equipment. Fabrication equipment 1608 can be used to fabricate at least one of metal parts, composite parts, semiconductors, circuits, fasteners, ribs, skin panels, spars, antennas, or other suitable types of parts.

Assembly equipment 1610 is equipment used to assemble parts to form aircraft 1500 in FIG. 15. In particular, assembly equipment 1610 is used to assemble components and parts to form aircraft 1500 in FIG. 15. Assembly equipment 1610 also can include machines and tools. These machines and tools may be at least one of a robotic arm, a crawler, a fastener installation system, a rail-based drilling system, or a robot. Assembly equipment 1610 can be used to assemble parts such as seats, horizontal stabilizers, wings, engines, engine housings, landing gear systems, and other parts for aircraft 1500 in FIG. 15.

In this illustrative example, maintenance system 1604 includes maintenance equipment 1612. Maintenance equipment 1612 can include any equipment needed to perform maintenance on aircraft 1500 in FIG. 15. Maintenance equipment 1612 may include tools for performing different operations on parts on aircraft 1500 in FIG. 15. These operations can include at least one of disassembling parts, refurbishing parts, inspecting parts, reworking parts, manufacturing replacement parts, or other operations for performing maintenance on aircraft 1500 in FIG. 15. These operations can be for routine maintenance, inspections, upgrades, refurbishment, or other types of maintenance operations.

In the illustrative example, maintenance equipment 1612 may include ultrasonic inspection devices, x-ray imaging systems, vision systems, drills, crawlers, and other suitable devices. In some cases, maintenance equipment 1612 can include fabrication equipment 1608, assembly equipment 1610, or both to produce and assemble parts that are needed for maintenance.

Product management system 1600 also includes control system 1614. Control system 1614 is a hardware system and may also include software or other types of components. Control system 1614 is configured to control the operation of at least one of manufacturing system 1602 or maintenance system 1604. In particular, control system 1614 can control the operation of at least one of fabrication equipment 1608, assembly equipment 1610, or maintenance equipment 1612.

The hardware in control system 1614 can be implemented using hardware that may include computers, circuits, networks, and other types of equipment. The control may take the form of direct control of manufacturing equipment 1606. For example, robots, computer-controlled machines, and other equipment can be controlled by control system 1614. In other illustrative examples, control system 1614 can manage operations performed by human operators 1616 in manufacturing or performing maintenance on aircraft 1500. For example, control system 1614 can assign tasks, provide instructions, display models, or perform other operations to manage operations performed by human operators 1616. In these illustrative examples, controller 214 from FIG. 2 can be implemented in control system 1614 to manage at least one of inserting wires into connectors during the manufacturing or maintenance of aircraft 1500 in FIG. 15. In other words, controller 214 can be used to control robots such as robotic arms with end effectors in at least one of fabrication equipment 1608 or assembly equipment 1610 to insert wires into connectors or other objects adding holes for wire insertion.

In the different illustrative examples, human operators 1616 can operate or interact with at least one of manufacturing equipment 1606, maintenance equipment 1612, or control system 1614. This interaction can occur to manufacture aircraft 1500 in FIG. 15.

Of course, product management system 1600 may be configured to manage other products other than aircraft 1500 in FIG. 15. Although product management system 1600 has been described with respect to manufacturing in the aerospace industry, product management system 1600 can be configured to manage products for other industries. For example, product management system 1600 can be configured to manufacture products for the automotive industry as well as any other suitable industries.

Thus, the illustrative examples provide a method, apparatus, system, and computer program product for wire insertion. In one illustrative example, a method provided for inserting a wire into a connector. An image of a connector is generated using a camera system connected to an end effector. The end effector is at a connector pose facing the connector. A region in the image encompassing the connector is selected. An initial mask is created using the image and the region. The initial mask comprises a background region and a connector region. A segmentation mask is created using the initial mask and the image, wherein the segmentation mask includes edges for the connector. Thresholding is applied to the segmentation mask to recover pixels for the connector and generate a final mask. The final mask is used to insert the wire into the connector.

In illustrative examples, wires can be inserted into the connector without generating a new final mask for each wire insertion. In the illustrative examples, the end effector is moved to the connector pose at which the image was generated for creating the final mask. The end effector returns the pose each time a wire is picked up for insertion into the connector. In this manner, the same final mask can be used to insert the wire from the connector pose.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A robotic system comprising:
   an end effector;
   a camera system connected to the end effector; and
   a controller, wherein the controller is configured to:
      generate an image of a connector using the camera system with the end effector at a connector pose facing a surface of the connector, the surface having holes for receiving wires, wherein the connector pose orients the end effector and the camera system such that the surface is perpendicular to an axis from the end effector and the camera system;

select a region in the image encompassing the connector;

create an initial mask using the image and the region, wherein the initial mask comprises a background region and a connector region;

create a segmentation mask using the initial mask and the image, wherein the segmentation mask includes edges for the connector; and apply thresholding to the segmentation mask to recover pixels for the connector and generate a final mask;

wherein the controller is further configured to insert a set of wires into the connector using the final mask.

2. The robotic system of claim 1, wherein in inserting the set of wires, the controller is configured to:

position the end effector holding a wire at the connector pose; and move the end effector at the connector pose to insert the wire into the connector using the final mask.

3. The robotic system of claim 2, wherein the controller is further configured to:

pick up a second wire using the end effector;

move the end effector back to the connector pose; and move the end effector at the connector pose to insert the second wire into the connector using the final mask.

4. The robotic system of claim 1, wherein in creating the initial mask, the controller is configured to:

create the background region as a first portion of the image outside of the region; and create the connector region as a second portion of the image defined by the region.

5. The robotic system of claim 1, wherein in creating the initial mask, the controller is further configured to:

create an inner connector region that is inside of the connector region, wherein the inner connector region is selected as having a higher probability of encompassing the connector than the connector region.

6. The robotic system of claim 1, wherein the connector region is defined by the region and by an inner connector region that is an inner portion of the connector region.

7. The robotic system of claim 1, wherein in selecting the region, the controller is configured to:

display the image on display system; and receive a user input from an input system, wherein the user input comprises a selection of the region.

8. The robotic system of claim 1 further comprising:

a robot, wherein the robot comprises the end effector, the camera system is connected to the end effector, and the end effector is connected to a platform.

9. A method for inserting a wire, the method comprising:

generating an image of a connector using a camera system connected to an end effector, wherein the end effector is at a connector pose facing a surface of the connector, the surface having holes for receiving wires, wherein the connector pose orients the end effector and the camera system such that the surface is perpendicular to an axis from the end effector and the camera system;

selecting a region in the image encompassing the connector;

creating an initial mask using the image and the region, wherein the initial mask comprises a background region and a connector region;

creating a segmentation mask using the initial mask and the image, wherein the segmentation mask includes edges for the connector;

applying thresholding to the segmentation mask to recover pixels for the connector and generate a final mask, wherein the final mask is used to insert the wire into the connector; and inserting a set of wires into the connector using the final mask.

10. The method of claim 9, wherein said inserting the set of wires comprises:

positioning the end effector holding a wire at the connector pose; and moving the end effector at the connector pose to insert the wire into the connector using the final mask.

11. The method of claim 10 further comprising:

picking up a second wire using the end effector;

moving the end effector back to the connector pose; and moving the end effector at the connector pose to insert the second wire into the connector using the final mask.

12. The method of claim 9, wherein said creating the initial mask comprises:

creating the background region as a first portion of the image outside of the region; and create the connector region as a second portion of the image defined by the region.

13. The method of claim 9, wherein said creating the initial mask comprises:

creating an inner connector region that is inside of the connector region, wherein the inner connector region is selected as having a higher probability of encompassing the connector than the connector region.

14. The method of claim 9, wherein the connector region is defined by the region and by an inner connector region that is an inner portion of the connector region.

15. The method of claim 9, wherein said selecting the region comprises:

displaying the image on a display system; and receiving a user input from an input system, wherein the user input comprises a selection of the region.

16. The method of claim 9, wherein a robot comprises the end effector, the camera system is connected to the end effector, and the end effector is connected to a platform.

17. A wire assembly system comprising:

a computer system; and a controller in the computer system, wherein the controller is configured to:

generate an image of a connector using a camera system connected to an end effector at a connector pose facing a surface of the connector, the surface having holes for receiving wires, wherein the connector pose orients the end effector and the camera system such that the surface is perpendicular to an axis from the end effector and the camera system;

select a region in the image encompassing the connector;

create an initial mask using the image and the region, wherein the initial mask comprises a background region and a connector region;

create a segmentation mask using the initial mask and the image, wherein the segmentation mask includes edges for the connector;

apply thresholding to the segmentation mask to recover pixels for the connector and generate a final mask; and control movement of the end effector to insert a wire into the connector using the final mask.

18. A computer program product for wire assembly, the computer program product comprising a computer-readable storage media having program instructions embodied therewith, the program instructions executable by a computer system to cause the computer system to:

generate an image of a connector using a camera system connected to an end effector at a connector pose facing a surface of the connector, the surface having holes for receiving wires, wherein the connector pose orients the end effector and the camera system such that the surface is perpendicular to an axis from the end effector and the camera system;

select a region in the image encompassing the connector;

create an initial mask using the image and the region, wherein the initial mask comprises a background region and a connector region;

create a segmentation mask using the initial mask and the image, wherein the segmentation mask includes edges for the connector;

apply thresholding to the segmentation mask to recover pixels for the connector and generate a final mask; and control movement of the end effector to insert a wire into the connector using the final mask.

19. The wire assembly system of claim 17, wherein in inserting the wire, the controller is configured to:

position the end effector holding the wire at the connector pose; and move the end effector at the connector pose to insert the wire into the connector using the final mask.

20. The wire assembly system of claim 19, wherein the controller is further configured to:

pick up a second wire using the end effector;

move the end effector back to the connector pose; and move the end effector at the connector pose to insert the second wire into the connector using the final mask.

* * * * *